United States Patent Office 3,006,628
Patented Oct. 31, 1961

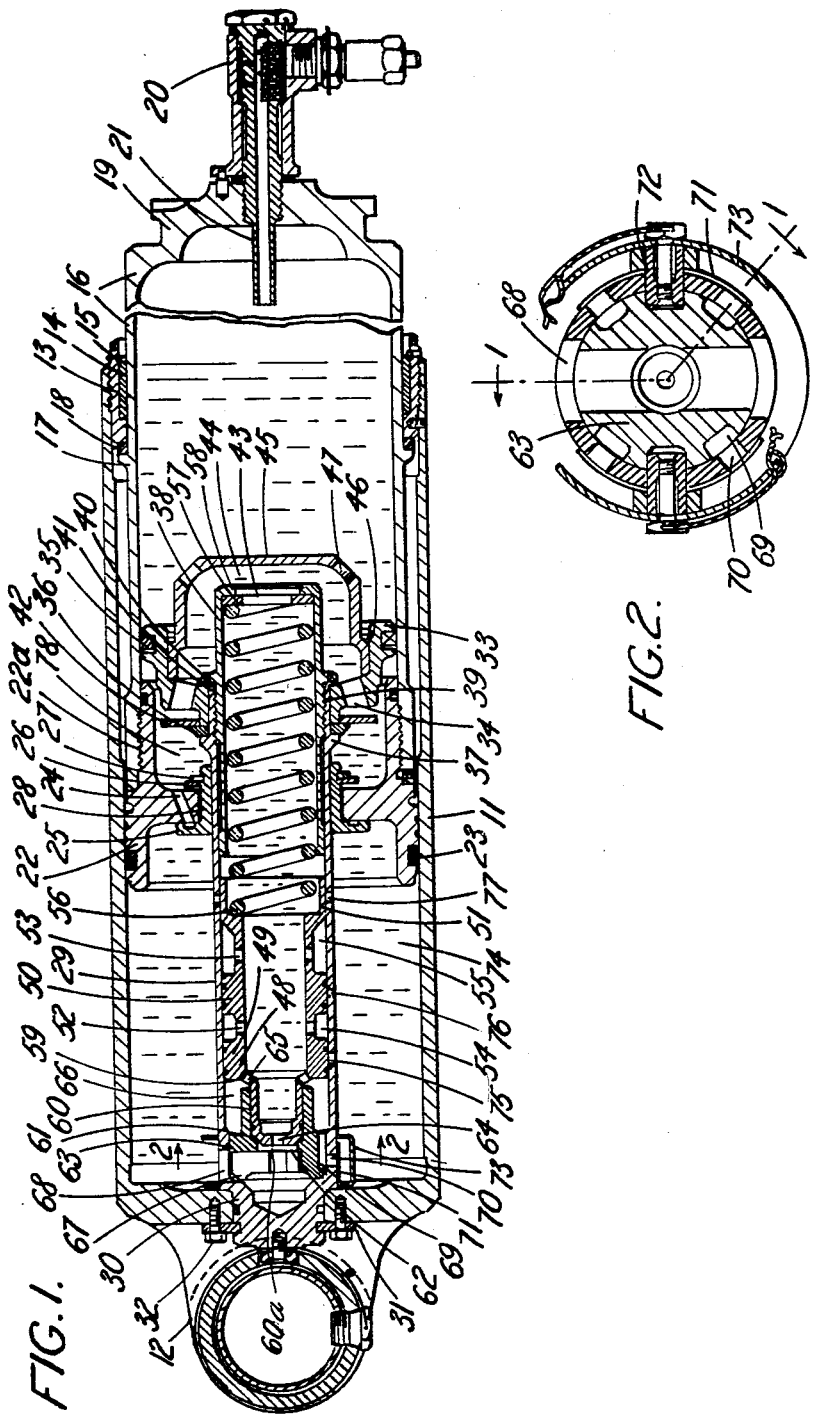

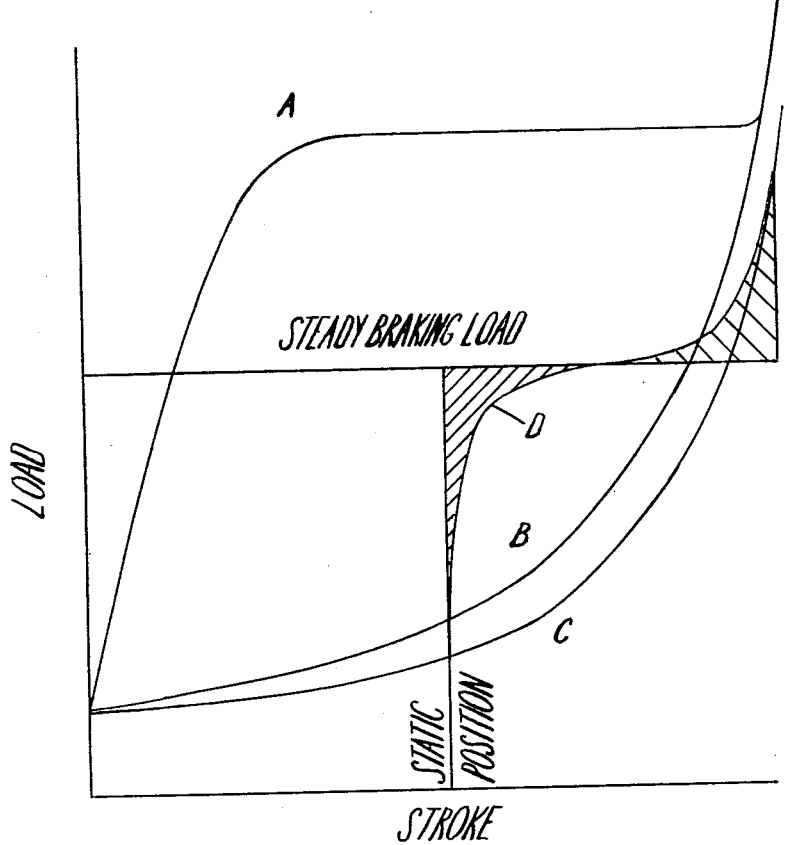

3,006,628
FLUID-DAMPED SHOCK ABSORBERS
Reginald Utting, Gloucester, England, assignor to Rotol Limited, Gloucester, England, a British company
Filed Apr. 27, 1959, Ser. No. 809,183
Claims priority, application Great Britain June 13, 1958
10 Claims. (Cl. 267—64)

The invention relates to fluid-damped shock absorbers and more especially, but not exclusively to shock absorbers suitable for use in the nose-wheel under-carriages of aircraft. The invention is concerned with shock absorbers of the kind in which an applied load causes relative closing movement between two parts of the absorber which movement is employed to force fluid, normally a liquid, through a constriction in order to effect damping.

Such shock absorbers are commonly required, especially when used for aircraft nose wheels, to operate under widely varying applied forces. For example when an aircraft is landing on a runway, the applied force may be very considerable and the required rate of closure of the shock absorber is high, whereas lower forces occur and lower closure rates are required during taxiing and braking. In shock absorbers of the above kind as at present constructed, the constriction is fixed in size during operation and the difficulty arises that if it is made large enough to permit of rapid closure during, say, landing of an aircraft, it may then be too large to provide the desired degree of damping when lower closure rates are desired, e.g. during braking. It is an object of the present invention to provide a shock absorber of the above kind which is better able to provide the appropriate degree of damping for high and low rates of closure.

The invention provides a shock absorber of the above kind characterised by means for increasing the effective area of the constrction with increase in fluid pressure drop across the constriction.

In the preferred form of the invention means are also provided for reducing the increased area, or limiting the increase, on further closing movement of the absorber beyond a predetermined intermediate position of closing.

The absorber may be combined, as in an oleo pneumatic shock absorber, with pneumatic or other resilient absorbing and necessary means and there may also be included recoil damping means. The recoil damping means may also be of the kind in which fluid is forced through a constriction, the constriction in this case preferably being of fixed area.

In a more specific form of the invention and in order to obtain the increase in effective area of the constriction as aforesaid, there are two constrictions, or groups of constrictions connected in parallel relation for flow of fluid therethrough, one constriction or group being constantly open to provide a minimum effective area and the other being variable in area by means of a movable valve member subjected to variations in the fluid pressure drop across the constantly open constriction, said valve member being operable by increase in said pressure above a predetermined minimum to increase the area of the variable constriction or group and spring means being provided for effecting return area-reducing movement of the valve member. When there is incorporated in this form of the invention means for reducing the increased area on closing movement of the shock absorbers beyond an intermediate position as referred to above, these means may comprise a second valve member movable with one part of the absorber and arranged to close or partially close the variable area constriction as the part moves beyond such position.

The invention will now be described by way of example with reference to the accompanying drawings of which:

FIGURE 1 shows a sectional side elevation, the section being taken on line 1—1 of FIGURE 2, of a shock absorber incorporating features according to the present invention, FIGURE 2 shows a cross section taken on line 2—2 of FIGURE 1 and, FIGURE 3 shows a typical performance curve relevant to the shock absorber described.

Referring to FIGURES 1 and 2 of the drawings, a shock absorber comprises a cylinder 11 closed at one end and there incorporating attachment means 12 for connection to an associated aerial vehicle. At its open end, to the right in the drawing, the cylinder 11 is provided with a screw-threaded ring member 13 engaging therewith, this member housing a bearing ring 14 which is retained by means of a circlip 15. The bearing ring 14 supports a sliding tube 16 which is arranged for telescoping movement with respect to the cylinder 11. Approximately midway along its length the sliding tube is provided with an external shoulder 17 which limits the outward movement of the sliding tube. A ring 18 of soft metal is interposed between the shoulder 17 and the member 13. During operation, this ring remains with the member 13 and acts as a stop for the sliding tube 16.

The sliding tube 16 is closed at its right-hand end in the drawing and is there provided with attachment means 19 for connection to the landing element of the vehicle. This end is further provided with inflation valve means 20 and an associated tube 21.

The inner end of the sliding tube 16 carries a stepped annular main piston 22 which is screwthreadedly attached at 22a to the sliding tube 16. The piston 22 is provided with sealing rings 23 and also with a set of recoil orifices 24 (only one of which is shown). In operable association with the recoil orifices 24 is a slidable plate member 25, the axial movement of which plate member 25 relatively to the piston 22 is restricted by means of a ring 26 and circlip 27. The plate member 25 has a tubular part 28 which is slidably mounted upon a cylindrical member 29 which is retained with respect to the end wall of the cylinder 11 by means of a recessed spigot 30, plates 31 and set bolts 32. The cylindrical member 29 is coaxially disposed with respect to the cylinder 11 and sliding tube 16 and extends to the right in the drawing, where it supports a stepped ring member 33 having a number of free flow apertures 34 provided therein. The outer diameter of the ring member 33 fits within the bore of the sliding tube 16, a bronze sealing and bearing ring 35 being provided. The ring member 33 is retained upon the cylindrical member 29 against a ring 36 which in turn bears against a shoulder 37 formed integrally with the cylindrical member 29, by means of a tube member 38. The tube member 38 is screwthreadedly engaged as at 39 with the bore of the cylindrical member 29. Castellations 40 upon the tube member 38 are engaged by a tab washer 41 to lock cylindrical member 29 and tube member 38 together. A plate valve 42 is provided between the ring 36 and the free flow holes 34.

The end of the tube member 38 more remote from the end wall of the cylinder (i.e. the right hand end in the drawing) is provided with an aperture 43 which communicates the interior of the cylindrical member 29 and tube member 38 with a chamber 44 enclosed by a bell-end member 45. The latter is retained within the step of the ring member 33 by means of a circlip 46 and is provided with apertures 47. The members 33 and 45 together form a counter-piston relatively slidable with respect to the sliding tube 16.

The cylindrical member 29 houses, intermediate its ends, a slide-type piston-valve 48 having three lands 49, 50 and 51. The valve 48 is hollow and is provided with sets of ports 52 and 53 which communicate the interior of the valve with annular chambers 54 and 55, respectively formed between lands 49 and 50, and 50 and 51. A coil spring 56 is interposed between the right-hand end face of the piston-valve 48 and an annular pad 57 seated against a flange 58 at the right-hand end of the tube member 38.

The piston-valve 48 is stepped down at 59 to a smaller diameter nose-part 60 formed with a piston valve face 60a. This nose-part 60 is provided with a frusto-conical end 61 which seats against a valve seat 62, provided in a flanged cylindrical valve-seat-member 63. The cylindrical part of the valve-seat-member 63 supports the nose-part 60 which is axially slidable in the said cylindrical part. The end wall of the nose-part 60 is provided with an aperture or restriction 64, while further apertures 65 at the step down part 59 place the interior of the piston valve 48 in communication with an annular chamber 66 surrounding the cylindrical part of the valve-seat-member 63.

The valve-seat-member 63 is retained at the left-hand end of the cylindrical member 29 in convenient manner and is provided with radial ports 67 which communicate with the aperture 64 in the end wall of the nose-part 60. These ports 67 also align with ports 68 in the wall of the cylindrical member 29. The outer diameter of the valve-seat-member 63 is cut-away as at 69 so as to place in communication the chamber 66 and ports 70 formed in the cylindrical member 29. Each port 70, there being four ports in all is provided with a leaf spring valve 71, each pair of these springs being anchored in convenient manner as at 72 (see FIGURE 2). The extent of opening of the valve 71 is limited by means of a shield member 73 fitted around the cylindrical member 29. When the ports 70 are open, therefore, the chamber 66 is in communication with the annular chamber 74 enclosed by the cylindrical member 29, the cylinder 11 and the main piston 22.

The cylindrical member 29 is further provided with three sets of radial apertures 75, 76 and 77 forming groups of constrictions. These apertures are closed by the lands 49, 50 and 51, respectively, when the piston-valve 48 is in the closed position, that is when its frusto-conical end 61 seats against the valve seat 62.

The shock absorber, when in the vertical position, with means 19 uppermost is filled with a suitable hydraulic fluid until the level reaches a desired point at the right-hand end in the drawing within the sliding tube 16. Thereafter a suitable gas is applied through the inflation valve means 20 and tube 21, until a desired pressure is reached.

The operation of the shock absorber will now be described.

When the aircraft is taxiing along the runway the pressure conditions in the shock absorber are such that the slide-type piston valve 48 is closed on to its seating 62 and therefore damping is achieved by fluid flow through the restriction 64, so that the fluid in effect by-passes the piston-valve 48. In this way sufficient energy is absorbed at the low velocities encountered in the taxiing and braked taxiing condition.

It will be understood that, under these low-velocity taxiing conditions, as the sliding tube 16 and main piston 22 are displaced on the closure or compression stroke, the plate member 25 slides upon the cylindrical member 29 to close the recoil orifices 24. As compression continues, fluid in the chamber 74 is displaced through the ports 68 and 67, and via the damping restriction 64, the interior of the piston-valve 48, the tube member 38, and aperture 43 into the chamber 44. Under these conditions the damping effect of the gas volume at the outer end of the sliding tube 16 is reduced in order to minimize the maximum reaction. The plate valve 42 opens to permit free flow of fluid from the chamber 44 through the orifices 34 into the recoil chamber 78. In this way the recoil chamber 78 is maintained hydraulically full.

Upon recoil of the shock absorber, the piston 22 moves away from the closed end of cylinder 11, i.e. to the right in drawing, and displacement of fluid occurs from the recoil chamber 78 through the recoil orifices 24 past the now open plate member 25 into the chamber 74 until the shock absorber reaches an equilibrium extension. While this recoil is occurring, the plate valve 42 closes the free flow apertures 34.

During landing of the aircraft however, the orifice 64 is inadequate to cater for the fluid flow that will be necessary. Accordingly upon compression of the shock absorber the pressure conditions pertaining result in the displacement of the valve 48 to the right in the drawing. This occurs as follows: as the piston 22 moves further into cylinder 11, i.e. to the left in the drawing, fluid is displaced from the chamber 74 through the ports 68 and 67 to the end face of the nose-part 60. The pressure build up at this point thus cracks open the frusto-conical end 61 and the pressure becomes effective over the total end area of the part 60 thereby to displace the piston-valve 48 away from valve-seat-member 63 i.e. to the right in the drawing against the effort of the coil spring 56. Hence the lands 49, 50 and 51 will move clear of and thereby open the ports 75, 76 and 77 respectively thereby increasing the effective flow area of the constrictions. Fluid in the annular chamber 74 can then flow through these ports and via the chambers 66, 54, 55 and ports 65, 52, 53 to the interior of the hollow piston valve 48 and the tube member 38. The fluid is further displaced through apertures 43 and 47 into the chamber to the right in the drawing of the counter piston 33/45, where such displacement is effectively damped by the gas volume enclosed in the right-hand end of the sliding tube 16, as well as by the restrictor 64 and ports 75, 76 and 77, depending upon which of these are operative.

As with the braked taxiing case, during the above closure or compression movement fluid is displaced from the chamber 44 through the orifices 34 into the recoil chamber 78.

As the piston 22 moves further into cylinder 11, i.e. to the left in the drawing, with the piston valve 48 open, the effective damping area is reduced with stroke position, by virtue of the fact that the tubular part 28 progressively covers ports 77, 76 and 75.

Upon recoil during the landing condition, the piston 22 in moving away from the closed end of cylinder 11 i.e. to the right in the drawing causes displacement of the fluid in the recoil chamber 78 through the recoil orifices 24 past the now open plate member 25 into the chamber 74. When this is occurring, the plate valve 42 closes the free flow apertures 34.

Further the valve 48 is closed into its seating 62, and thus the ports 75, 76 and 77 are closed off by lands 49, 50 and 51. Fluid displaced by the expanding gas volume passes through the ports 47, chamber 44, aperture 43, the interior of the tube member 38, the interior of the piston-valve 48, the ports 65, the annular chamber 66, the cut-away slots 69, the ports 70 and the leaf spring valves 71 into the chamber 74 until the shock absorber has reached an equilibrium condition. At the same time fluid passes through the interior of the piston-valve 48 and through the aperture 64, ports 67 and 68 into the chamber 74.

The valve mechanism hereinbefore described as incorporated in this shock absorber therefore provides the following:

(a) A constant small orifice at low closure of compression velocities, (b) An orifice which varies with the stroke of the shock absorber at high closure or compression velocities, (c) Recoil damping orifice means which are separate from, and unaffected by, the closure orifices.

With these characteristics it is possible to obtain optimum efficiency in landing or braked taxiing cases, thereby reducing maximum ground reactions.

The invention is more particularly applicable to nose-wheel under-carriages and a typical performance curve, characteristic of the present invention, is shown in FIGURE 3.

The graph indicated in FIGURE 3 plots load against stroke and indicates the performance effect of the slide type piston valve 48 in giving variable orifice characteristics when open and constant orifice characteristics when closed.

Curve A represents the normal landing performance of the shock absorber and curve B is the dynamic gas curve. Curve C is the isothermal curve, being characteristic of the relatively slow closure of the shock absorber during the braked taxiing case.

The graph shows that by the combined fixed and variable damping orifice system incorporated in the new shock absorber, more damping is achieved by the orifices, thereby relieving the gas volume of a corresponding proportion. Consequently, the maximum pressure in the gas volume may be accordingly reduced or alternatively the steady braking load which may be catered for is correspondingly larger.

The lower shaded area on the graph indicates the energy which is required to be absorbed by the gas volume in order to meet the dynamic braking case. The upper and lower shaded areas should be equal.

What I claim is:

1. A shock absorber comprising an outer tubular member and in inner tubular member telescoping within the outer member, a piston on the end of the inner member within the outer member and in substantially fluid-tight connection with the interior of said outer member, said tubular members defining two fluid chambers one on each side of said piston, a hollow tube located within said outer member and being axially movable as one with said outer member, said tube extending in fluid tight relationship through said piston, and having flow passages therethrough connecting the chamber defined by the outer tubular member with the interior of the hollow tube, and an opening through which the interior of the hollow tube is in fluid communication with the chamber defined by the inner tubular member, a piston valve slidable within said tube and having a piston face subject to the pressure in the chamber defined by the outer tubular member, said piston valve having a permanently open constriction therethrough also placing the chamber defined by the outer tubular member in communication with the interior of the hollow tube, and resilient means urging said piston valve into a position in which it closes off said flow passages in the hollow tube.

2. A shock absorber as claimed in claim 1, including recoil damping means in the form of constriction means of fixed flow area through the piston.

3. A shock absorber as claimed in claim 1 in combination with a resilient damping means in operative connection with one of said members.

4. A shock absorber as claimed in claim 3 wherein said resilient damping means is a pneumatic damping means.

5. A shock absorber as claimed in claim 3 further including recoil damping means.

6. A shock absorber as claimed in claim 5 wherein said recoil damping means is in the form of further constriction means joining the two chambers.

7. A shock absorber as claimed in claim 6 wherein said further constriction means is of fixed effective flow area.

8. A shock absorber comprising a cylinder and a piston slidably disposed in the cylinder, said piston dividing the cylinder into two chambers, first fluid passage means extending between said chambers and permitting flow in each direction through it, second fluid passage means extending between said chambers and having a one-way valve adapted to permit flow therethrough when said piston and cylinder move relative to each other in one sense but not when the piston and cylinder move relative to each other in the opposite sense, third fluid passage means extending between said chambers and having therein first valve means responsive to the difference between the pressures in the two chambers, which valve means is adapted to open the third fluid passage means to augment the flow area of the first passage means only when the pressure in one of the chambers exceeds that in the other by a predetermined amount on relative movement of the piston and cylinder in said opposite sense, and fourth fluid passage means extending between said chambers and having therein a one-way valve responsive to the difference between the pressures in the two chambers and adapted to open the fourth fluid passage means to augment the flow area of said first and second passage means only when the pressure in said other chamber exceeds that in said one chamber by a predetermined amount on relative movement of said piston and cylinder in said one sense.

9. A shock absorber comprising a cylinder and a piston which is slidably disposed in the cylinder and divides the cylinder into two chambers, a tube mounted on the end of the cylinder remote from the piston and extending lengthwise of the cylinder, which tube has a main opening adjacent its point of connection to said cylinder and a plurality of ports axially spaced from each other along the tube serving to place the interior of the tube in fluid communication with one of said chambers said parts being disposed so as to be blanked off successively by said piston during movement of the piston towards said end of the cylinder, and which tube extends sealingly through the piston and has its interior in fluid communication with the other of said chambers, a valve seat within said tube having a passage therethrough communicating with said main opening, a tubular valve member which is slidably mounted within said tube and seats against said valve seat and which has a piston valve face facing said end of the cylinder, said valve member having a tubular stem formed externally with axially-spaced peripheral lands and with apertures between said lands which apertures communicate with the interior of the valve member, spring means seated within the tube and loading the valve member against the valve seat, said piston valve being movable between a closed position in which said piston valve face is subjected to the fluid pressure in said one chamber and in which said lands blank off said ports and an open position in which said lands are moved to place the ports in communication with the interior of the tube through said apertures in the tubular stem, and spring means seated within the tube and loading the valve member against the valve seating.

10. A shock absorber comprising a cylinder and a piston slidably disposed in the cylinder, said piston dividing the cylinder into two chambers, first fluid passage means extending between said chambers and permitting flow in each direction through it, second fluid passage means extending between said chambers and having a one-way valve adapted to permit flow therethrough when said piston and cylinder move relative to each other in one sense but not when the piston and cylinder move relative to each other in the opposite sense, third fluid passage means extending between said cahmbers and having therein first valve means responsive to the difference between the pressures in the two chambers, which valve means is adapted to open the third fluid passage means to augment the flow area of the first passage means only when the pressure in one of the chambers exceeds that in the other by a predetermined amount on relative movement of the piston and cylinder in said opposite sense, and fourth fluid passage means extending between said chambers and having therein a one-way valve responsive to the difference between the pressures in the two chambers and adapted to open the fourth fluid passage means to augment the flow area of said first and second passage means only when the pressure in said other chamber exceeds that in said one chamber by a predetermined amount on relative movement of said piston and cylinder in said one sense, said piston gradually blanking off said third fluid passage means during relative movement of the piston and cylinder in said opposite sense.

References Cited in the file of this patent

UNITED STATES PATENTS

| | | |
|---|---|---|
| 2,240,644 | Focht | May 6, 1941 |
| 2,352,197 | Harvey | June 27, 1944 |
| 2,823,915 | Carbon | Feb. 18, 1958 |
| 2,865,396 | Focht | Dec. 23, 1958 |
| 2,937,724 | Schnitzer | May 24, 1960 |
| 2,947,386 | Schnitzer | Aug. 2, 1960 |

FOREIGN PATENTS

| | | |
|---|---|---|
| 1,073,613 | France | Mar. 24, 1954 |
| 1,127,313 | France | Aug. 6, 1956 |
| 1,138,400 | France | Jan. 28, 1957 |